United States Patent
Anand

(10) Patent No.: US 9,686,199 B2
(45) Date of Patent: Jun. 20, 2017

(54) METHOD AND SYSTEM FOR IMPLEMENTING ETHERNET OAM IN A SOFTWARE-DEFINED NETWORKING (SDN) SYSTEM

(71) Applicant: Telefonaktiebolaget L M Ericsson (publ), Stockholm (SE)

(72) Inventor: Prashant Anand, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 14/520,224

(22) Filed: Oct. 21, 2014

(65) Prior Publication Data

US 2016/0112328 A1 Apr. 21, 2016

(51) Int. Cl.
*H04L 12/815* (2013.01)
*H04L 12/24* (2006.01)
*H04L 12/26* (2006.01)

(52) U.S. Cl.
CPC ............ *H04L 47/22* (2013.01); *H04L 41/024* (2013.01); *H04L 41/0806* (2013.01); *H04L 43/026* (2013.01); *H04L 41/0622* (2013.01); *H04L 43/065* (2013.01)

(58) Field of Classification Search
CPC ..... H04L 2012/56; H04L 12/56; H04L 43/02; H04L 47/22
See application file for complete search history.

(56) References Cited

U.S. PATENT DOCUMENTS

| | | | |
|---|---|---|---|
| 5,974,046 A * | 10/1999 | Kim ................... | H04Q 11/0478 370/241.1 |
| 9,246,847 B2 * | 1/2016 | Mishra ................ | H04L 69/04 |
| 2006/0037003 A1 * | 2/2006 | Long ................... | G06F 9/45504 717/127 |
| 2014/0280834 A1 | 9/2014 | Medved et al. | |
| 2015/0249572 A1 * | 9/2015 | Mack-Crane ........ | H04L 45/38 709/222 |
| 2015/0381324 A1 * | 12/2015 | Mirsky ............... | H04L 1/24 370/241.1 |

(Continued)

OTHER PUBLICATIONS

"OpenFlow Switch Specification", Open Networking Foundation, Version 1.3.1 (Wire Protocol 0x04), Sep. 6, 2012, 128 pages.

(Continued)

*Primary Examiner* — Xavier Szewai Wong
(74) *Attorney, Agent, or Firm* — Nicholson De Vos Webster & Elliott LLP

(57) ABSTRACT

A method for implementing Ethernet operation, administration, and management (OAM) function in a network element coupled to a software-defined networking (SDN) system is disclosed. The method comprises adding a flow table entry for an OAM traffic flow to a flow table of the network element. The method continues with adding a group table entry for the OAM traffic flow to a group table of the network element, where the group table entry includes an instruction to send the packet to a set of ports, including a loopback port. The method continues with receiving the packet directing to the group table entry from the SDN controller, and sending the packet to the set of ports of the network element according to the group table entry, where the packet is to be looped back through the loopback port to the flow table periodically at a predetermined interval.

20 Claims, 8 Drawing Sheets

(56) References Cited

U.S. PATENT DOCUMENTS

| | | | | | |
|---|---|---|---|---|---|
| 2015/0381428 | A1* | 12/2015 | Ong | ........................ | H04L 41/12 |
| | | | | | 709/223 |
| 2016/0150448 | A1* | 5/2016 | Perras | ................... | H04W 48/17 |
| | | | | | 455/450 |

OTHER PUBLICATIONS

"Virtual Bridged Local Area Networks—Amendment 5: Connectivity Fault Management", IEEE P802.1ag/D8.1, Interworking Task Group of IEEE 802.1, Jun. 18, 2007, 255 pages.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
S. Deering, et al., "Internet Protocol, Version 6 (IPv6) Specification," Dec. 1998, 39 pages, Network Working Group, Request for Comments: 2460, The Internet Society.
Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The internet Society.

D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
B. Fenner, et al., "Management Information Base for the User Datagram Protocol (UDP)," Jun. 2005, 19 pages, Network Working Group, Request for Comments: 4113, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private Lan Service (VPLS) Using BGP for Auto-Discovery and Signaling," Jan. 2007, 28 pages, Network Working Group, Request for Comments: 4761, The IETF Trust.
M. Lasserre, et al., "Virtual Private Lan Service (VPLS) Using Label Distribution Protocol (LDP) Signaling," Jan. 2007, 31 pages, Network Working Group, Request for Comments: 4762, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF).
Request for Comments: 5865, IETF Trust and the persons identified as the document authors.
"SPARC ICT-258457 Split Architecture for Large Scale Wide Area Networks. Deliverable D3.3", Dec. 1, 2011, pp. 1-129.
Murakami et al., "Highly Reliable and Large-Capacity Packet Transport Networks: Technologies, Perspectives, and Standardization", Journal of Lightwave Technology, IEEE Service Center, vol. 32, No. 4, Feb. 15, 2014, pp. 805-816.

* cited by examiner

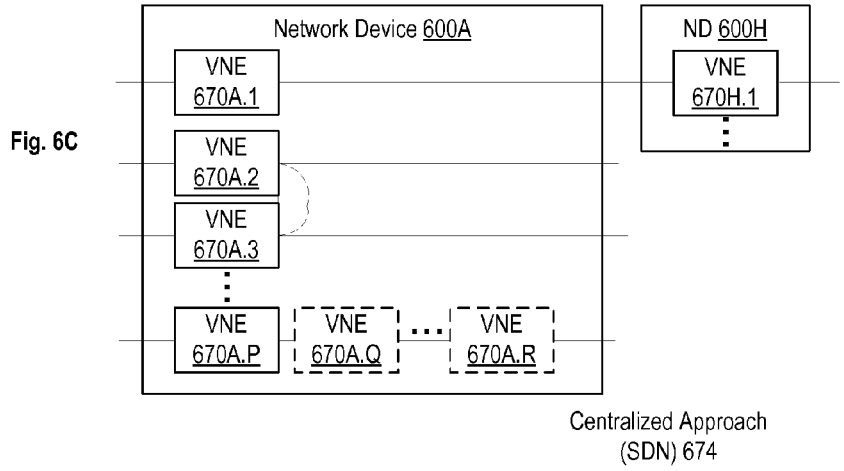
Fig. 6C
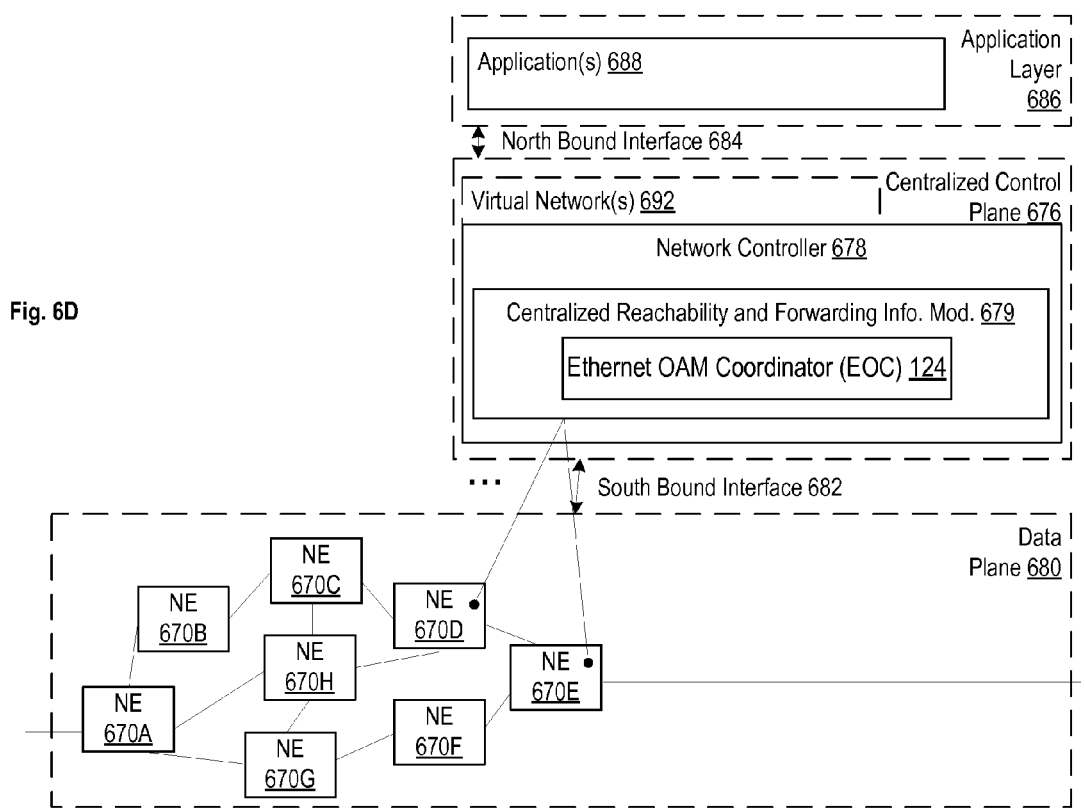
Fig. 6D
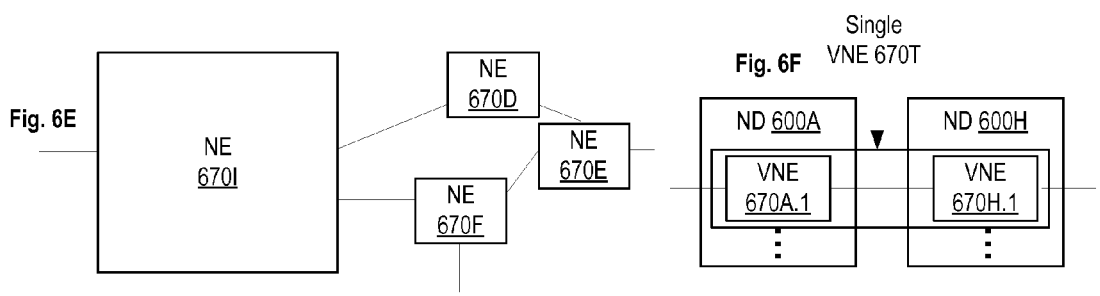
Fig. 6E
Fig. 6F

US 9,686,199 B2

METHOD AND SYSTEM FOR IMPLEMENTING ETHERNET OAM IN A SOFTWARE-DEFINED NETWORKING (SDN) SYSTEM

FIELD OF INVENTION

The embodiments of the invention are related to the field of networking. More specifically, the embodiments of the invention relate to a method and system for implementing Ethernet Operation, Administration, and Management (OAM) in a software-defined networking (SDN) system.

BACKGROUND

Ethernet has become one of the dominant technologies in various segments of networks, including local area networks (LANs), metropolitan area networks (MANs), and wide-area networks (WANs). Ethernet OAM has been an integral part of Ethernet offerings in ensuring that Ethernet delivers the required customer service-level agreements (SLAs).

Software-Defined Networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

With both of SDN and Ethernet being preeminent in networking, it is desirable to be able to implement Ethernet OAM functions in a SDN system.

SUMMARY

A method for implementing Ethernet operation, administration, and management (OAM) function in a network element coupled to a software-defined networking (SDN) system is disclosed. The SDN system contains a plurality of network elements processing traffic flows and a SDN controller managing the plurality of network elements. The method comprises adding an entry to a flow table of the network element, where the entry is a flow table entry associated with an OAM traffic flow for an Open System Interconnect (OSI) layer 2 (L2) service. The method continues with adding an entry to a group table of the network element, where the entry is a group table entry to be selected upon receiving a packet matching the flow table entry associated with the OAM traffic flow for the OSI L2 service, where the group table entry includes an instruction to send the packet to a set of ports, including a loopback port for the packet to be looped back to the flow table at a predetermined interval. The method continues with receiving the packet directing to the group table entry from the SDN controller, and sending the packet to the set of ports of the network element according to the group table entry, where the packet is to be looped back through the loopback port to the flow table of the network element periodically at the predetermined interval.

A network element implementing Ethernet operation, administration, and management (OAM) function is disclosed. The network element is coupled to a software-defined networking (SDN) system. The SDN system contains a plurality of network elements processing traffic flows and a SDN controller managing the plurality of network elements. The network element comprises a processor and a non-transitory machine-readable storage medium coupled to the processor. The non-transitory machine-readable storage medium contains an Ethernet OAM module executable by the processor. The network element is operative to add an entry to a flow table of the network element, where the entry is a flow table entry associated with an OAM traffic flow for an Open System Interconnect (OSI) layer 2 (L2) service. The network element is further operative to add an entry to a group table of the network element, where the entry is a group table entry to be selected upon receiving a packet matching the flow table entry associated with the OAM traffic flow for the OSI L2 service, where the group table entry includes an instruction to send the packet to a set of ports, including a loopback port for the packet to be looped back to the flow table at a predetermined interval. The network element is further operative to receive the packet directing to the group table entry from the SDN controller and send the packet to the set of ports of the network element according to the group table entry, where the packet is to be looped back through the loopback port to the flow table of the network element periodically at the predetermined interval.

A non-transitory machine-readable medium for implementing Ethernet operation, administration, and management (OAM) function is disclosed. The non-transitory machine-readable medium has instructions stored therein, which when executed by a processor, cause the processor to perform operations in a network element coupled to a software-defined networking (SDN) system. The SDN system contains a plurality of network elements processing traffic flows and a SDN controller managing the plurality of network elements. The operations comprise adding an entry to a flow table of the network element, where the entry is a flow table entry associated with an OAM traffic flow for an Open System Interconnect (OSI) layer 2 (L2) service; adding an entry to a group table of the network element, where the entry is a group table entry to be selected upon receiving a packet matching the flow table entry associated with the OAM traffic flow for the OSI L2 service, where the group table entry includes an instruction to send the packet to a set of ports, including a loopback port for the packet to be looped back to the flow table at a predetermined interval; receiving the packet directing to the group table entry from the SDN controller; and sending the packet to the set of ports of the network element according to the group table entry, where the packet is to be looped back through the loopback port to the flow table of the network element periodically at the predetermined interval.

Embodiments of the invention aim at implementing Ethernet OAM functions efficiently at a SDN system so that a SDN controller is not involved in real-time, repetitive operations in each Ethernet OAM session. Instead, the SDN controller only initiates Ethernet OAM sessions and intervenes when an Ethernet OAM session operates abnormally.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 6C illustrates various exemplary ways in which virtual network elements (VNEs) may be coupled according to some embodiments of the invention.

FIG. 6D illustrates a network with a single network element (NE) on each of the NDs of FIG. 6A, and a centralized approach for maintaining reachability and forwarding information (also called network control), according to some embodiments of the invention.

FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention.

DETAILED DESCRIPTION

Figures 1A, 1B:
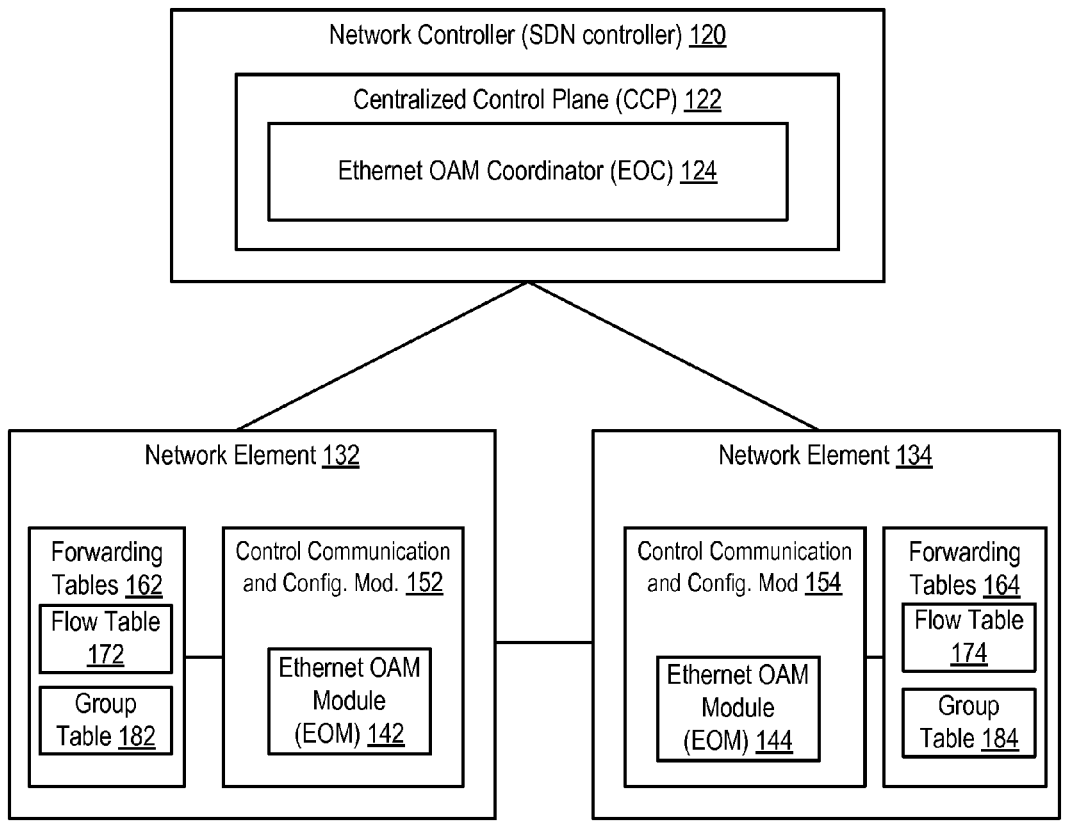
FIG. 1A illustrates an architecture of SDN system implementing Ethernet OAM functions according to one embodiment of the invention.
FIG. 1B illustrates an exemplary flow table entry and group table entry according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Challenges of Implementing Ethernet OAM in a SDN System

Ethernet OAM performs connectivity fault management (CFM). CFM performs functions such as path discovery, fault detection, fault verification and isolation, fault notification, and fault recovery. CFM may be performed through continuity check messages (CCMs, sometimes referred to as CCM/CFM messages, which are Ethernet OAM messages), which are periodically inserted in traffic flows of an underlying system. The Ethernet OAM messages are inserted at a network element, which is at one end of a maintenance end point (an edge of a domain), and the Ethernet OAM messages are supposed to be received at another network element at the other end of the maintenance end point (another edge of the domain). When the other network element does not receive the Ethernet OAM messages for a certain time period, a fault is declared and the associated OSI layer 2 (L2) service is marked as being down. Ethernet OAM may achieve a high granularity in measuring the health of a L2 service. For example, Ethernet OAM messages (e.g., CCM/CFM messages) periodic transmission can be as low as 3.3 milliseconds and a fault will be declared if three packets are not received at the receiving end point. Through the timely detection, a network operator may detect a fault within 10 milliseconds and switch within 50 milliseconds thus offering carrier grade services.

One way to implement Ethernet OAM in a SDN system is to lean heavily on a network controller (also referred to as a SDN controller) of a SDN system as the network controller coordinates management of the SDN system. The network controller may be configured with all the L2 end points where Ethernet OAM messages are supposed to be inserted and received. Afterward, the network controller starts inserting the Ethernet OAM messages (in the form of packets) for all the configured L2 end points for all the L2 services in the SDN system through messages to the network elements of the SDN system (e.g., switches of the SDN system) at a periodic interval.

The Ethernet OAM messages are sent through PACKET_OUT messages when the SDN system complies with OpenFlow implementation in one embodiment. OpenFlow is proposed by the Open Networking Foundation (ONF) that is dedicated to the promotion and adoption of SDN, and it has proposed implementation standards such as OpenFlow Switch Specifications 1.3 and 1.4.

At the receiving end of the Ethernet OAM messages, the receiving network element forwards the Ethernet OAM messages to the network controller (e.g., through PACKET_IN messages). The network controller then examines the Ethernet OAM messages and determines whether the associated L2 services are alive or down.

In this approach, the network controller is in the middle of a real-time network function. It is responsible for Ethernet OAM packet insertion and removal for each L2 end point and L2 service. Given the number of network elements that a network controller may manage, it is difficult to achieve high performance and scalability. For example, it would be challenging for a network controller to insert Ethernet OAM packets in every 3.3 milliseconds for hundreds or even thousands of L2 services that the SDN system may process.

Architectures for Implementing Ethernet OAM

Given the challenges of implementing Ethernet OAM with the network controller performing the majority of the operations, it is desirable to give the network elements managed by the network controller more active roles in implementing Ethernet OAM. FIG. 1A illustrates an architecture of a SDN system implementing Ethernet OAM functions according to one embodiment of the invention.

SDN system 100 contains network controller 120, which manages a number of network elements such as network elements 132 and 134. The detailed operations of a network controller and network elements are discussed herein below in relation to FIGS. 6 and 7. Network controller 120 contains centralized control plane 122, which includes Ethernet OAM coordinator (EOC) 124. A network element such as network element 132 and 134 contains one or more forwarding tables such as forwarding tables 162 and 164. Each forwarding table includes one or more flow tables and group tables—flow table 172 and group table 182 for network element 132, and flow table 174 and group table 184 for network element 134 respectively. Each network element also includes a control communication and configuration module such as control communication and configuration modules 152 and 154, each having an Ethernet OAM module (EOM) such as EOMs 142 and 144 respectively.

Forwarding tables store routing information to direct routing of incoming packets by a network element. Forwarding tables may have a variety of types. For example, the OpenFlow standard defines flow table, group table, meter table, etc. Each table contains one or more table entries. FIG. 1B illustrates an exemplary flow table entry 201 and group table entry 211 according to one embodiment of the invention.

Flow table entry 201 contains:
Match fields 202: To match against packets. These comprise the ingress port and packet headers, and optionally metadata specified by a previous table.
Priority 203: Matching precedence of a flow entry.
Counters 204: Updated when packets are matched.
Instructions 206: To modify the action set or pipeline processing.
Timeouts 207: Maximum amount of time or idle time before flow is expired by the network element.
Cookie 208: Opaque data value chosen by the network controller. May be used by the controller to filter flow statistics, flow modification, and flow deletion.

A flow table entry may be identified by its match fields and priority; the match fields and priority taken together identify a unique flow entry in the flow table. A flow table entry generally allows the packets of a matching flow to be dropped or forwarded to one port. That is, a flow table entry generally allows a network element to dispose a packet to one port. For Ethernet OAM functions, only some flow table entries are needed, and these flow table entries (1) are to be associated with corresponding end points of L2 services, and (2) direct packets for further process at a group table. Thus, these flow table entries may be physically or logically separated from the rest of the flow table entries, and form a "monitor table," which is a subset of a flow table or one of a number of flow tables of the network element.

Group table entry 211 contains:
Group identifier 212: A numeric number (e.g., a 32 bit unsigned integer) uniquely identifying a group.

Group type 214: To determine group semantics.

Counters 216: Updated when packets are processed by a group.

Action buckets 218: An ordered list of action buckets, where each action bucket contains a set of actions to execute and associated parameters.

A group table may be identified by a group identifier. A group table entry generally allows the packets of a matching flow to be forwarded to: a random port on a group of ports (for load-balancing), a first live port on a group of ports (for failover), and all ports on a group of ports (for multicasting). Thus, a group table entry allows a network element to dispose a packet to multiple ports. As discussed herein below, the property of the group table entry makes it feasible to engage network elements to play a more active role in implementing Ethernet OAM functions.

Operations in Sending Network Element for Implementing Ethernet OAM

Figure 2A:
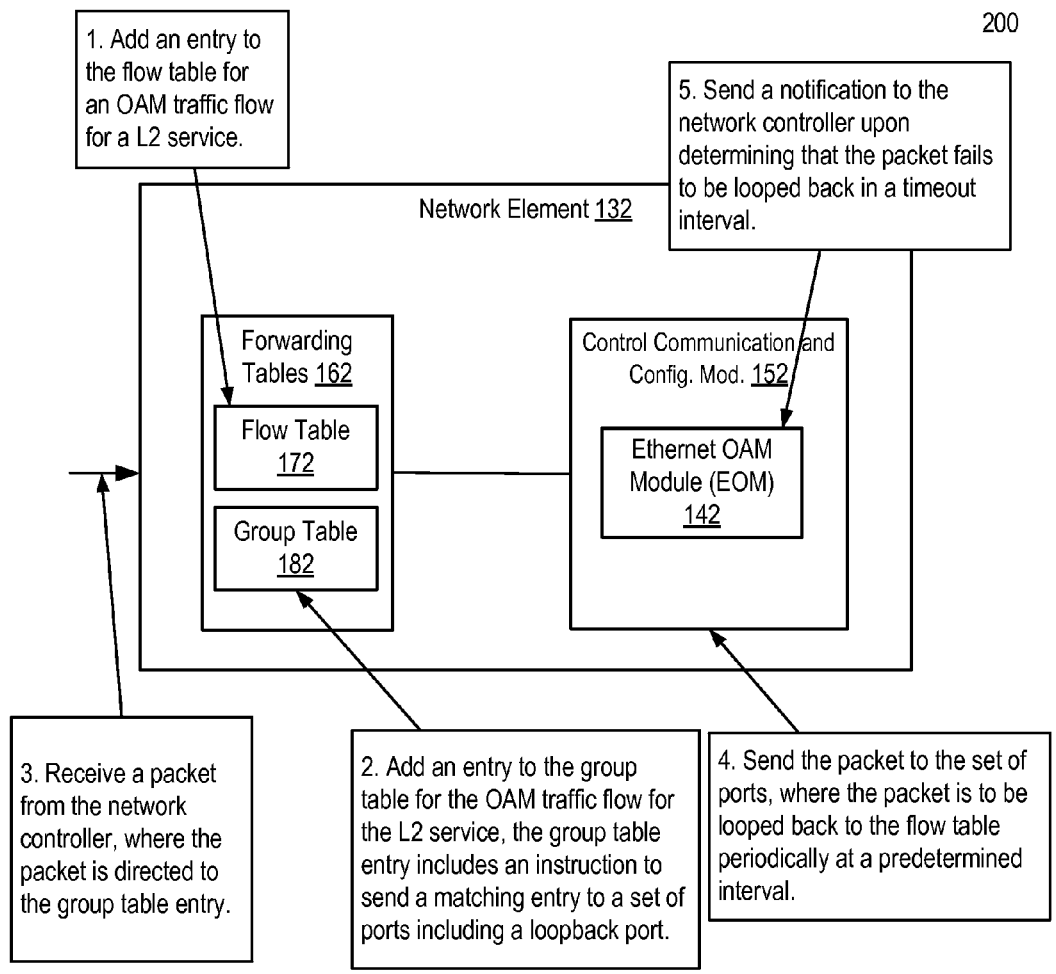
FIG. 2A illustrates operations in a sending network element for implementing Ethernet OAM according to one embodiment of the invention.

FIG. 2A illustrates operations in a sending network element for implementing Ethernet OAM according to one embodiment of the invention. Network element 132 is the same as the network element 132 of FIG. 1A, and the same or similar references indicate elements or components having the same or similar functionalities. Certain aspects of FIG. 1A have been omitted from FIG. 2A in order to avoid obscuring other aspects of FIG. 2A. Task boxes 1 to 5 illustrate the order in which operations are performed according to one embodiment of the invention.

At task box 1, network element 132 adds an entry to a flow table of the network element. The flow table may be one of the flow tables of the network element, where the flow table is dedicated to monitoring traffic health ("monitor table" discussed herein above), and it may be a part of a regular flow table. The added flow table entry is associated with an OAM traffic flow for an OSI L2 service. The flow table entry may be identified by a flow identifier in one embodiment, and the flow identifier may be implemented through cookie 208 above, for example. The addition of the flow table entry may be triggered by a request from a network controller such as network controller 120, which identifies network element 132 as an L2 end point of the L2 service and as the sending end point of the L2 service for OAM functions. The flow identifier implemented through cookie 208 may be allocated by network controller 120 in one embodiment. The flow identifier facilitates interactions between network element 132 and network controller 120, e.g., network element 132 may inform network controller 120 if anything abnormal happens to the sending L2 end point.

The flow table entry sets the timeout value (e.g., the value at timeouts 207) to a packet so that network element is alerted when a packet matching the flow table entry stays longer than the timeout value. The timeout value is for the packet to be expired for transmission at the network element. The flow table entry sets its instructions (e.g., instructions 206) so that a packet matching the flow table entry is forwarded to a group table entry for the OAM traffic flow.

At task box 2, network element 132 adds an entry to a group table of the network element. The group table entry is to be selected upon receiving a packet matching the flow table entry associated with the OAM traffic flow for the L2 service. That is, the packet matching the flow table entry is given to the group table entry for further actions. The group table entry includes an instruction to send the packet to a set of ports, including a loopback port for the packet to be looped back to the flow table at a predetermined interval. The instruction may be an action in action buckets 218 as illustrated in FIG. 1B. Other than the loopback port, the set of ports are the ports involved in monitoring the L2 service through the packet, which contains an OAM message and thus may be referred to as Ethernet OAM packet. The OAM message embedded in the packet may contain information typically found in a CCM/CFM message for a L2 service. The group table entry may be added based on information received from the network controller about the L2 service for the OAM traffic flow.

At task box 3, network element 132 receives a packet directing to the group table entry from the network controller. The packet is an Ethernet OAM packet associated with the OAM flow of the L2 service. The direction of the packet may be provided through a matching group identifier such as group identifier 212 in the packet in one embodiment. That is, the packet is forwarded directly to the group table without going through the flow table for processing. Since the packet is from the network controller and may be sent in a PACKET_OUT format, it is distinguishable from a data packet received at network element 132. The direction of the packet may also be provided through matching the flow table entry of the flow table in another embodiment, in which case the packet from the network controller is processed through the flow table and the group table, same as other data packets.

At task box 4, network element 132 sends the packet to the set of ports of the network element according to the group table entry, where the packet is to be looped back through the loopback port to the flow table of the network element periodically at the predetermined interval. That is, after the network controller initiates the OAM traffic flow with the packet with the OAM message, the network controller is no longer involved in the real-time operations of OAM of the L2 service, and network element 132 sends out the periodic packet to its receiving network element(s), where the packet is presented at the flow table through the loopback.

The packet may be looped back continuously without the involvement of network controller 120 after sending the initial packet, from which the loopback operations starts. With the continuous loopback, the timeout value associated with the packet (set through timeouts 207 as discussed hereinabove) will not time out as its timeout value is reset every time the packet gets processed through the flow table. In that case, the flow is deemed to be operating normally. If the loopback path fails or otherwise does not work properly, the packet will not be looped back to the flow table within the timeout period as specified in the timeouts, in which case the network element may send a notification to the network controller at task box 5, so that the network controller may intervene and fix the failure.

Figure 2B:
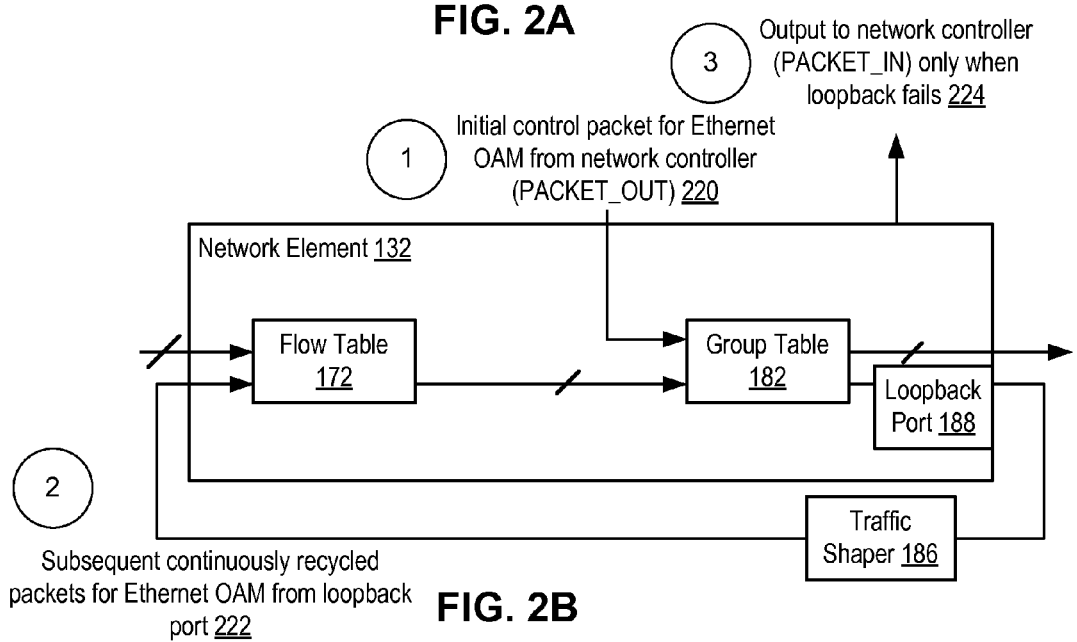
FIG. 2B illustrates various packets relating to the Ethernet OAM at the sending network element according to one embodiment of the invention.

FIG. 2B illustrates various packets relating to the Ethernet OAM at the sending network element according to one embodiment of the invention. Network element 132 in FIG. 2B is the same as the network element 132 of FIG. 2A, and the same or similar references indicate elements or components having the same or similar functionalities. Cycles 1 to 3 illustrate the order in which the packets are processed according to one embodiment of the invention.

At cycle 1, network controller 120 sends an initial control packet for Ethernet OAM at reference 220. The packet is referred to as "control" packet as it is sent from the network controller, and the control packet may be the same Ethernet OAM packet as discussed in association with FIG. 2A. The control packet takes the PACKET_OUT format in one embodiment. The control packet may be sent from Ethernet OAM coordinator (EOC) 124 of the network controller 120 as illustrated in FIG. 1A. The control packet contains an Ethernet OAM message such as CCM/CFM message for a L2 service. The control packet is sent directly to group table 182 in one embodiment, where the control packet matches a group table entry for the L2 service. It is to be noted that the initial control packet may be sent to the flow table instead in an alternate embodiment, in which case the control packet matches a flow table entry for the L2 service, and the control packet will be given to the group table later for further processing. When the control packet matches the group table entry for the L2 service, the packet will be forwarded to a set of ports associated with the group table entry, one of which is loopback port 188, and the others are toward receiving network elements of the L2 service for OAM functions.

Loopback port 188 is to loop back a packet to flow table 172 and it may be implemented in several ways:

- The loopback may be implemented as an external loopback across two physical ports, in which case network element 132 does not need to change its operation in accommodation of the loopback—the loopback can be transparent to network element 132 in making forwarding decisions.
- The loopback may be implemented as an internal loopback either through a special port or one of the physical ports set in internal loopback mode.
- The loopback may be implemented through a software extension at the network element, where a local port is emulated as a loopback port. In this embodiment, the packet is given a special encapsulation, so that the network element detects that this is a loopback packet and hence will be inserted back to the packet process pipeline starting at flow table 172. In addition, the packet may be delayed a period, so it will be inserted back to the pipeline at flow table 172 after a recycling time interval.

When the loopback is accomplished through a software extension, the Ethernet OAM packet may be delayed using the software extension, and no additional delay is needed to make the packet be looped back at the recycling time interval. Otherwise, traffic shaper 186 may be utilized to delay the packet prior to sending it to flow table 172. Traffic shaper 186 is created as a delay element and will be configured based on the recycling time interval of the packet. Traffic shaper 186 may be implemented in several ways:

- The traffic shaper may be attached to the queue associated with the loopback port. Delay of the traffic shaper may be based on the implementation of the loopback port. That is, the protocol for processing packets in a network element (e.g., OpenFlow specification) needs no change.
- The traffic shaper may be configured through the protocol for processing packets in a network element of a SDN system. For example, a traffic shaper configuration message may be sent from the network controller to configure the delay for a particular loopback port.
- The traffic shaper may be configured using an existing protocol for processing packets in a network element of a SDN system. For example, in OpenFlow Switch Specification 1.3.4, Section 7.2.2, an OpenFlow (OF) switch (i.e., a network element of a SDN system) has a queue, and the queue may be configured with a maximum-rate and a minimum-rate. One may configure this queue using standard OpenFlow message of queue configuration setting maximum-rate=minimum-rate. This rate can be selected as the required interval between two Ethernet OAM packets. According to the Specification, the queue length may be configured in bytes, so that the network element may be configured with adequate buffering for the queue and hence the recycled packet will always find the place in the queue to get admitted and wait for the time since it gets scheduled as per allocated bandwidth for the queue. In this embodiment, the queue works like a delay element and may not need any change of the existing protocol.

The packet goes through loopback port 188 and traffic shaper 186 and reaches flow table 172. In FIG. 2B, the traffic shaper 186 is illustrated outside of network element 132 and after loopback port 188. Traffic shaper 186 may be implemented within network element 132 and prior to loopback port 188 in one embodiment. Also, as discussed herein above, traffic shaper 186 may be unnecessary in some embodiments.

The packet then cycles through flow table 172, group table 182, loopback port 188, and traffic shaper 186 (the combination of which may be referred to as a packet recirculation path), while the packet is sent to other ports to reach receiving network elements of the L2 service. The subsequent continuously recycled packet for Ethernet OAM from loopback at cycle 2 arrives at flow table 172 at a predetermined interval (e.g., 3.3 milliseconds as discussed herein above) at reference 222.

In one embodiment, the packet continues the cycling at network element 132 until one of two events occurs:

- The packet is no longer transmitted at the predetermined interval. The packet is associated with a timeout value, which may be a bit higher than the predetermined interval value. When the packet is not received at the timeout value, network element 132 will notify network controller 120 at cycle 3, where the network element outputs to network controller a message (e.g., in PACKET_IN format) at reference 224. The packet may contain a cookie that identifies the flow so that the network controller knows the OAM for the L2 service encounter failure at the sending end point.
- The Ethernet OAM session of the L2 service is to be terminated. When the Ethernet OAM session is to be terminated, the flow table entry associated with the Ethernet OAM session is deleted, so that the packet will not be sent to the loopback port, which is associated with the group table entry. Similarly, the associated group table entry may be deleted too.

Operations in Receiving Network Element for Implementing Ethernet OAM

Figure 3A:
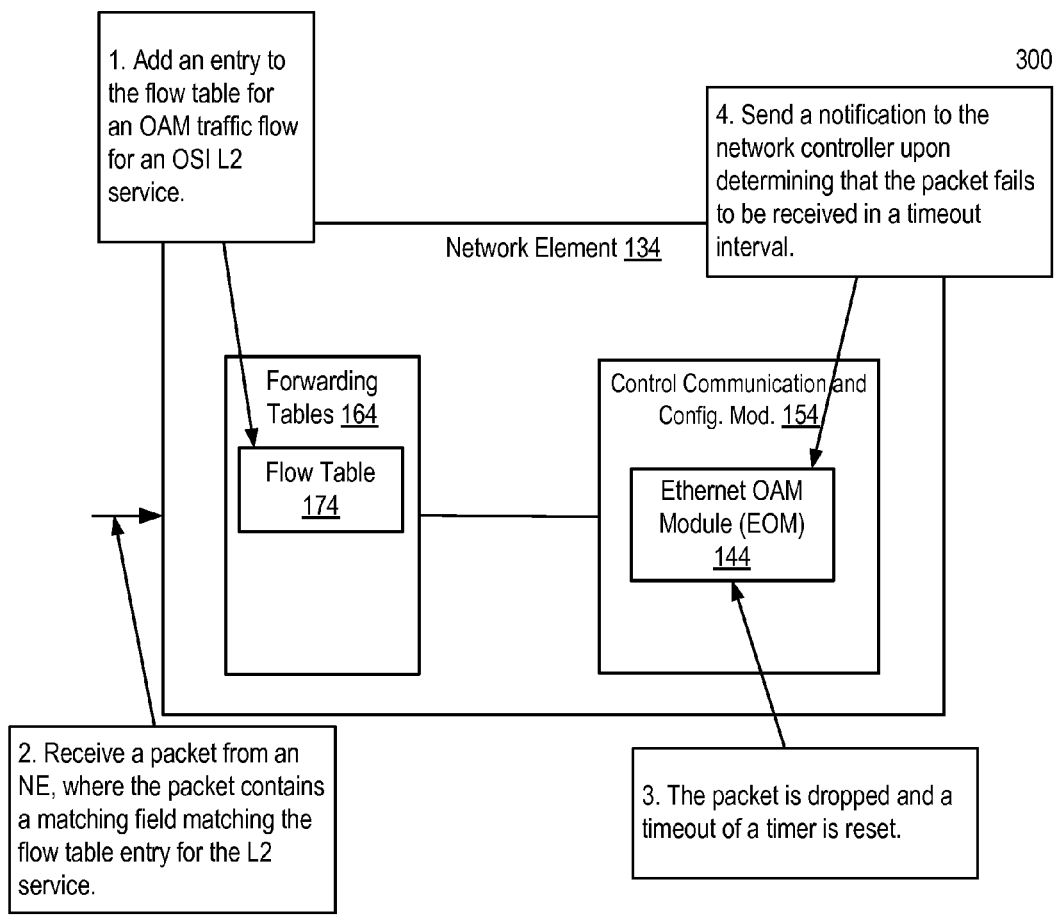
FIG. 3A illustrates operations in a receiving network element for implementing Ethernet OAM according to one embodiment of the invention.

FIG. 3A illustrates operations in a receiving network element for implementing Ethernet OAM according to one embodiment of the invention. Network element 134 is the same as the network element 134 of FIG. 1A, and the same or similar references indicate elements or components having the same or similar functionalities. Certain aspects of FIG. 1A have been omitted from FIG. 3A in order to avoid obscuring other aspects of FIG. 3A. Task boxes 1 to 4 illustrate the order in which operations are performed according to one embodiment of the invention.

At task box 1, network element 134 adds an entry to a flow table of the network element. The flow table may be one of the flow tables of the network element, where the flow table is dedicated to monitoring traffic health ("monitor table" discussed herein above), and it may be a part of a regular flow table. The added flow table entry is associated with an OAM traffic flow for an OSI L2 service. The flow table entry may be identified by a flow identifier in one embodiment, and the flow identifier may be implemented through cookie 208 above, for example. The addition of the flow table entry may be triggered by a request from a network controller such as network controller 120, which identifies network element 134 as an L2 end point of the L2 service and as the receiving end point of the L2 service for OAM functions. The flow identifier implemented through cookie 208 may be allocated by network controller 120 in one embodiment. The flow identifier facilitates interactions between network element 134 and network controller 120, e.g., network element 134 may inform network controller 120 if anything abnormal happens to the receiving L2 end point.

At task box 2, network element 134 receives a packet from another network element (e.g., network element 132), and the packet contains a matching field matching the flow table entry for the L2 service. The matching may be for a combination of matching fields and priority as discussed herein above.

At task box 3, network element 134 drops the packet for the L2 service (Ethernet OAM packet) and resets a timeout value associated with the L2 service. In this case, the Ethernet OAM packet is received as expected, and the receiving network element is reset for the next Ethernet OAM packet. The network element 134 may send the packet to another flow table/group table for further processing in some cases.

The timeout value is an idle timeout value that may be set through timeouts 207 in FIG. 1B. The timeout value may be set to be a predetermined value, for example, around the time taking three Ethernet OAM packets to arrive at the receiving end point of the L2 service at network element 134. For example, if the sending end point of the L2 service sends an Ethernet OAM packet every 3.3 milliseconds, the timeout value may be set to 10 milliseconds, and if no Ethernet OAM packet is received for the L2 service at the receiving end point after waiting 10 milliseconds, network element 134 sends a notification to the network controller at task box 4.

Figure 3B:
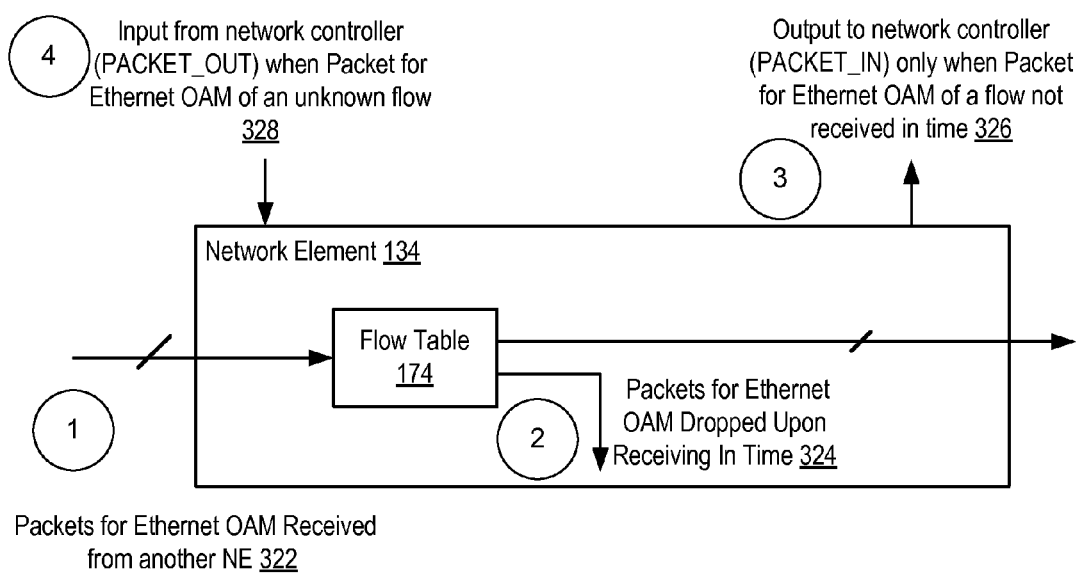
FIG. 3B illustrates various packets relating to the Ethernet OAM at the receiving network element according to one embodiment of the invention.

FIG. 3B illustrates various packets relating to the Ethernet OAM at the receiving network element according to one embodiment of the invention. Network element 134 in FIG. 3B is the same as the network element 134 of FIG. 3A, and the same or similar references indicate elements or components having the same or similar functionalities. Cycles 1 to 4 illustrate the order in which the packets are processed according to one embodiment of the invention.

At cycle 1, network element 134 receives an Ethernet OAM packet from another network element at reference 322. The Ethernet OAM packet contains OAM information such as a CCM/CFM message for a L2 service. At cycle 2, the Ethernet OAM packet is dropped at reference 324 when the Ethernet OAM packet is received within a predetermined timeout period. The predetermined timeout period at the receiving network element may be different from the predetermined timeout period at the sending network element, e.g., the former may be about three times longer than the latter. At cycle 3, network element 134 sends a notification to the network controller at reference 326 when no Ethernet OAM packet is received for the L2 service at the predetermined timeout period at the receiving network element.

At cycle 4, the network controller sends a message to the network element 134 when network element 134 receives an Ethernet OAM packet with an unknown flow at reference 328. That is, when network element 134 detects that a flow is missing, it notifies the network controller in order to recover the flow, using a message similar to the output at reference 326, which may take the PACKET_IN format. The message may include the whole or a portion of the packet with the unknown flow. Network controller in turn provides routing information using the message, which may take the PACKET_OUT format. The message may be used by network element 134 to add one or more entries in the flow table so that network element 134 may recover the flow. After the recovery, network controller can then decouple from real-time operation of the Ethernet OAM operations.

Flow Diagrams for Implementing Ethernet OAM

As discussed herein above, the network controller (also referred to as SDN controller) is not responsible for Ethernet OAM packet insertion and reception through packets sending to and from the network controller (e.g., through PACKET_IN and PACKET_OUT messages). Instead, the Ethernet OAM packets are processed through the network elements that the network controller manages. Thus, the network controller is decoupled from the high frequency repetitive data plane events occurring at the network elements. The network controller configures the network elements through directing the addition of table entries and inserting the initial Ethernet OAM packets, and the network elements proceed with processing the Ethernet OAM packets autonomously when the Ethernet OAM functions normally. When the Ethernet OAM does not function normally, the network controller is notified and then involved in restoring the Ethernet OAM function.

Figure 4:
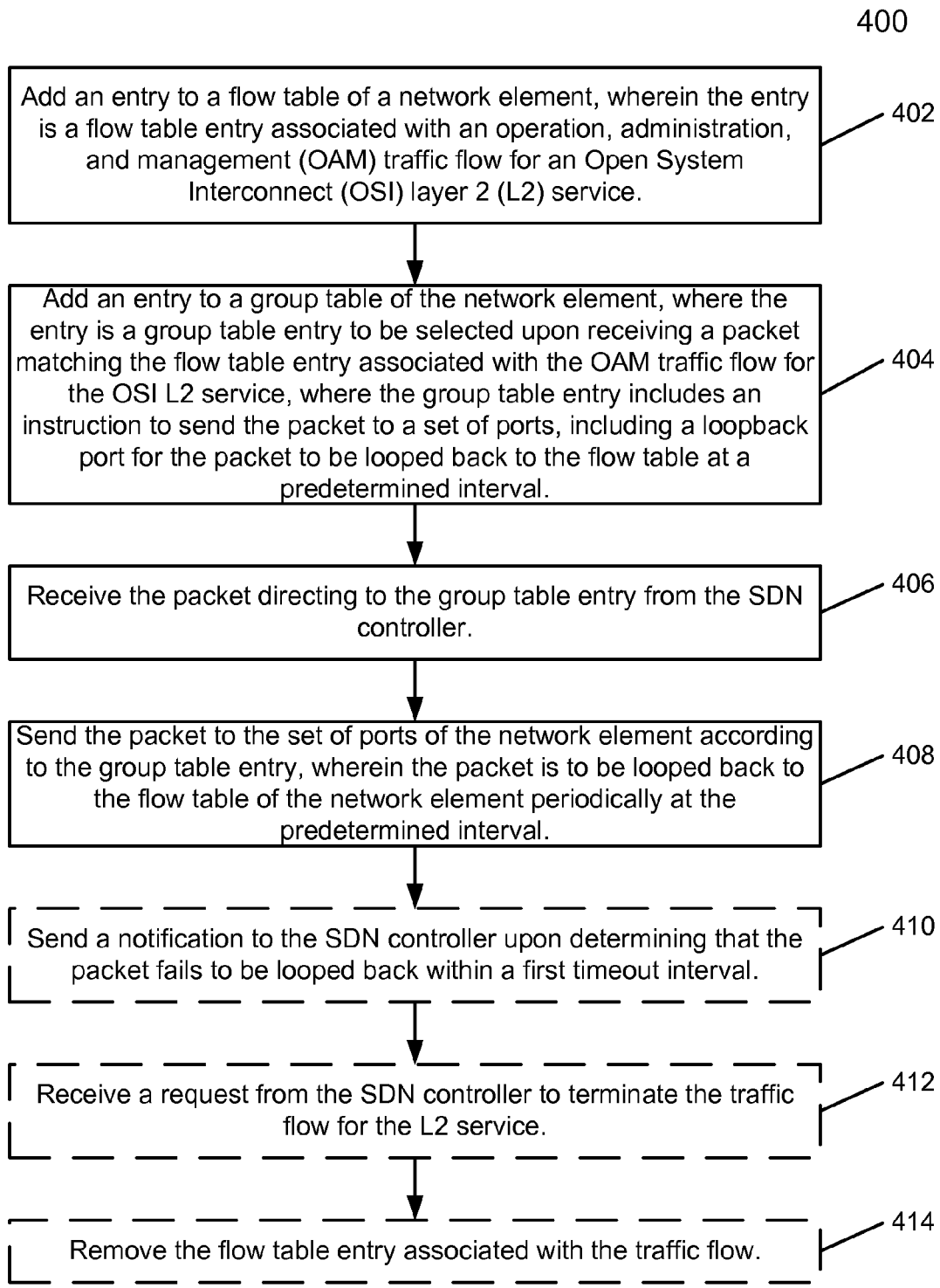
FIG. 4 is a flow diagram illustrating operations of a sending network element in implementing Ethernet OAM according to one embodiment of the invention.

FIG. 4 is a flow diagram illustrating operations of a sending network element in implementing Ethernet OAM according to one embodiment of the invention. Method 400 may be implemented in network element 132 of FIG. 1A according to one embodiment of the invention.

At reference 402, the network element adds an entry to a flow table of the network element, where the entry is a flow table entry associated with an OAM traffic flow for a L2 service. The flow table entry is set with a flow identifier (e.g., through a cookie setting of the flow table entry), and a timeout value with a predetermined interval for a matching packet to the flow table entry to time out (e.g., through timeouts setting of the flow table entry).

At reference 404, the network element adds an entry to a group table of the network element, where the entry is a group table entry to be selected upon receiving a packet matching the flow table entry associated with the OAM traffic flow for the OSI L2 service, where the group table entry includes an instruction to send the packet to a set of ports, including a loopback port for the packet to be looped back to the flow table at a predetermined interval. As discussed herein above, the set of ports also includes at least one other port forwarding the packet to perform OAM functions based on the information in the packet, which may contain a CCM/CFM message. The loopback port is a physical port wired to loop back to the network element in one embodiment. In an alternate embodiment, the loopback port is a logical port with emulated loopback functions.

At reference 406, the network element receives the packet directing to the group table entry from a SDN controller. The packet is determined to be directed to the group table entry based on criteria such as containing a group identifier matching the group identifier of the group table entry, or the packet contains matching field matching the flow table entry above.

At reference 408, the network element sends the packet to the set of ports of the network element according to the group table entry, where the packet is to be looped back through the loopback port to the flow table of the network element periodically at the predetermined interval. In one embodiment, the packet is delayed through a traffic shaper in looping back to the flow table at the predetermined interval.

At reference 410, the network element optionally sends a notification to the SDN controller upon determining that the packet fails to be looped back within a first timeout interval.

In one embodiment, the network element receives at reference 412 a request from the SDN controller to terminate the OAM traffic flow for the L2 service. At reference 414, the network element removes the flow table entry associated with the OAM flow.

Figure 5:
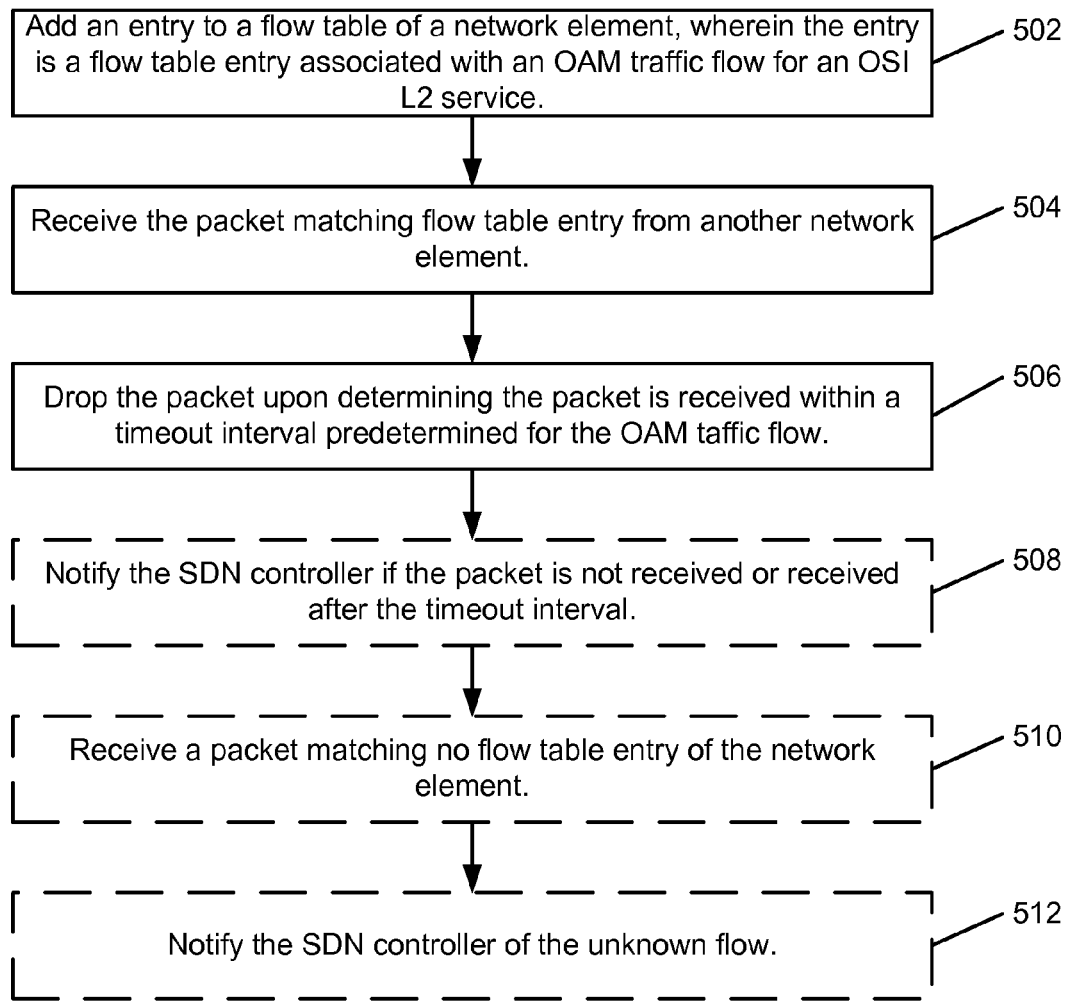
FIG. 5 is a flow diagram illustrating operations of a receiving network element in implementing Ethernet OAM according to one embodiment of the invention.

FIG. 5 is a flow diagram illustrating operations of a receiving network element in implementing Ethernet OAM according to one embodiment of the invention. Method 500 may be implemented in network element 134 of FIG. 1A according to one embodiment of the invention. The network element 134 is the receiving network element at the other end point of the L2 service of the sending network element 132 that sends out the Ethernet OAM packet, thus method 500 may be a continuation of method 400 in that it discloses operations at the receiving network element.

At reference 502, the network element adds an entry to a flow table of the network element, where the entry is a flow table entry associated with an OAM traffic flow for a L2 service. The flow table entry is set with a flow identifier (e.g., through a cookie setting of the flow table entry), and a timeout value with a predetermined interval for a matching packet to the flow table entry to time out (e.g., through timeouts setting of the flow table entry). The timeout value at the receiving network element may be different from the timeout value of the sending network element discussed herein above, and it may be much longer. In one embodiment, the timeout value at the receiving network element is about three times longer than that of the sending network element. Other ratios between the timeout values of the sending and receiving network elements may be implemented based on the principles disclosed herein.

At reference 504, the network element receives a packet matching the flow table entry from another network element. For the packet matching the flow table entry, the network element determines that the packet is an Ethernet OAM packet. At reference 506, the network element drops the packet upon determining that the packet is received within the timeout interval predetermined for the OAM traffic flow. The timeout interval is stored in the matching flow table entry in one embodiment.

At reference 508, the network element optionally sends a notification to the SDN controller upon determining that the packet is not received within the predetermined timeout interval.

In one embodiment, the network element receives at reference 510 a packet matching no flow table entry of the network element. The network element notifies the SDN controller at reference 512 of the unknown flow. The SDN controller then sends flow information through its control packet (e.g., packet in PACKET_OUT format), and the network element then uses the information to add flow table entries to forward the packets of the originally unknown flows.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6A:
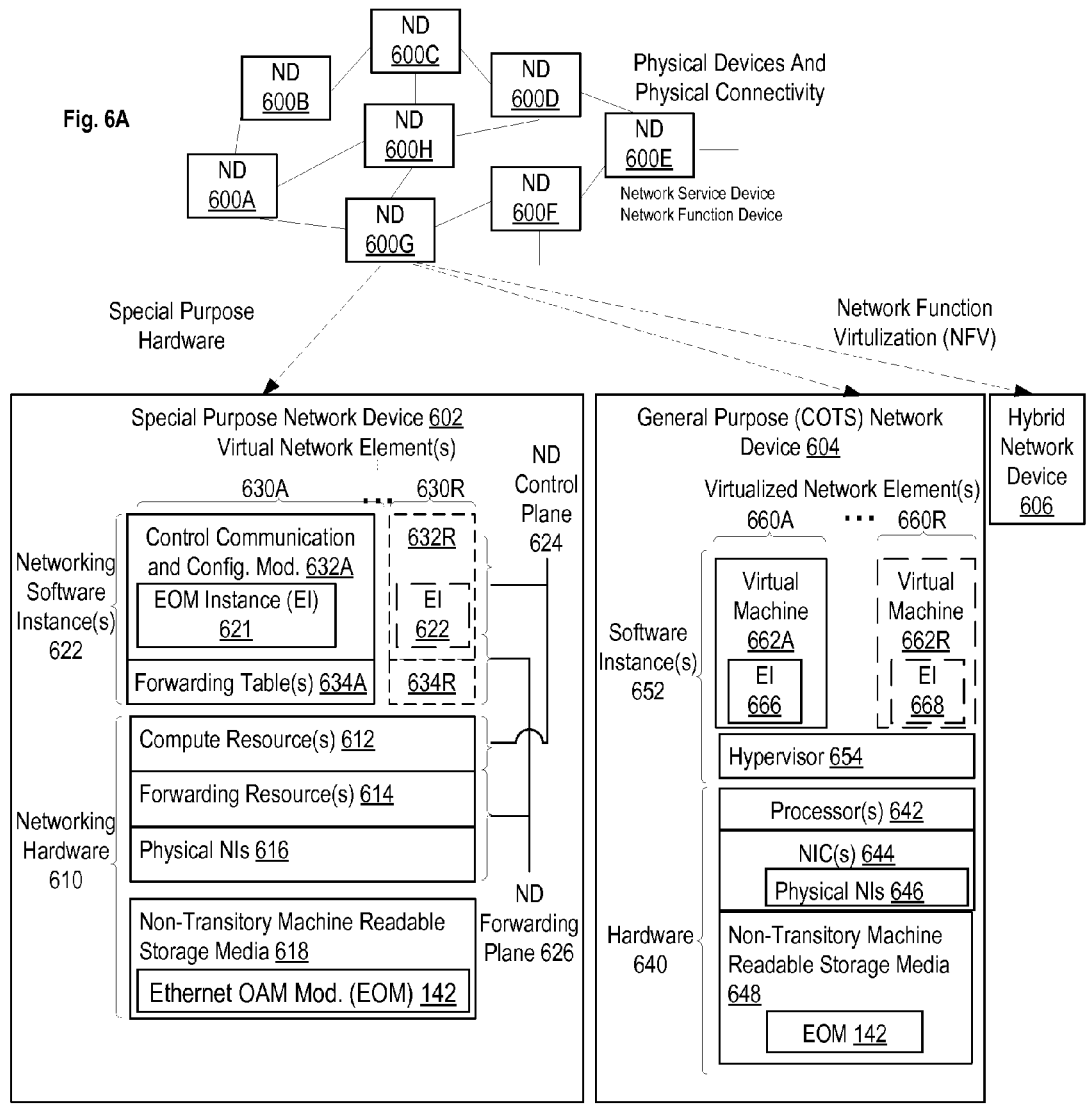
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software, such as Ethernet OAM module (EOM) 142 as discussed herein above, which is a software module configured on special purpose network device 602 for coordinating Ethernet OAM functions. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, Ethernet OAM module 142 may be executed by the networking hardware 610 to instantiate an EOM instance (EI) 621, which perform methods discussed herein above such as methods 400 and 500. EI 621 and that part of the networking hardware 610 that executes that instance (be it hardware dedicated to that networking software instance and/or time slices of hardware temporally shared by that networking software instance with others of the EOM instance 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
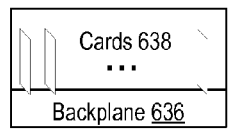
FIG. 6B illustrates an exemplary way to implement the special-purpose network device 602 according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein monitor 650. During operation, the processor(s) 642 execute the monitor 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R.

The virtual network element(s) 660A-R perform similar functionality to the virtual network element(s) 630A-R. The EOM instances 666 and 668 are instantiated in virtual machines 662A to 662R. The hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612; in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A. Specifically, FIG. 6D illustrates network elements (NEs) 670A-H with the same connectivity as the NDs 600A-H of FIG. 6A with a centralized approach for maintaining reachability and forwarding information (also called network control), according to some embodiments of the invention.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). The centralized reachability and forwarding information module 679 contains Ethernet OAM coordinator (EOC) 124 as illustrated in FIG. 1A.

The network intelligence is centralized in the centralized control plane 676 executing on electronic devices that are typically separate from the NDs. For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
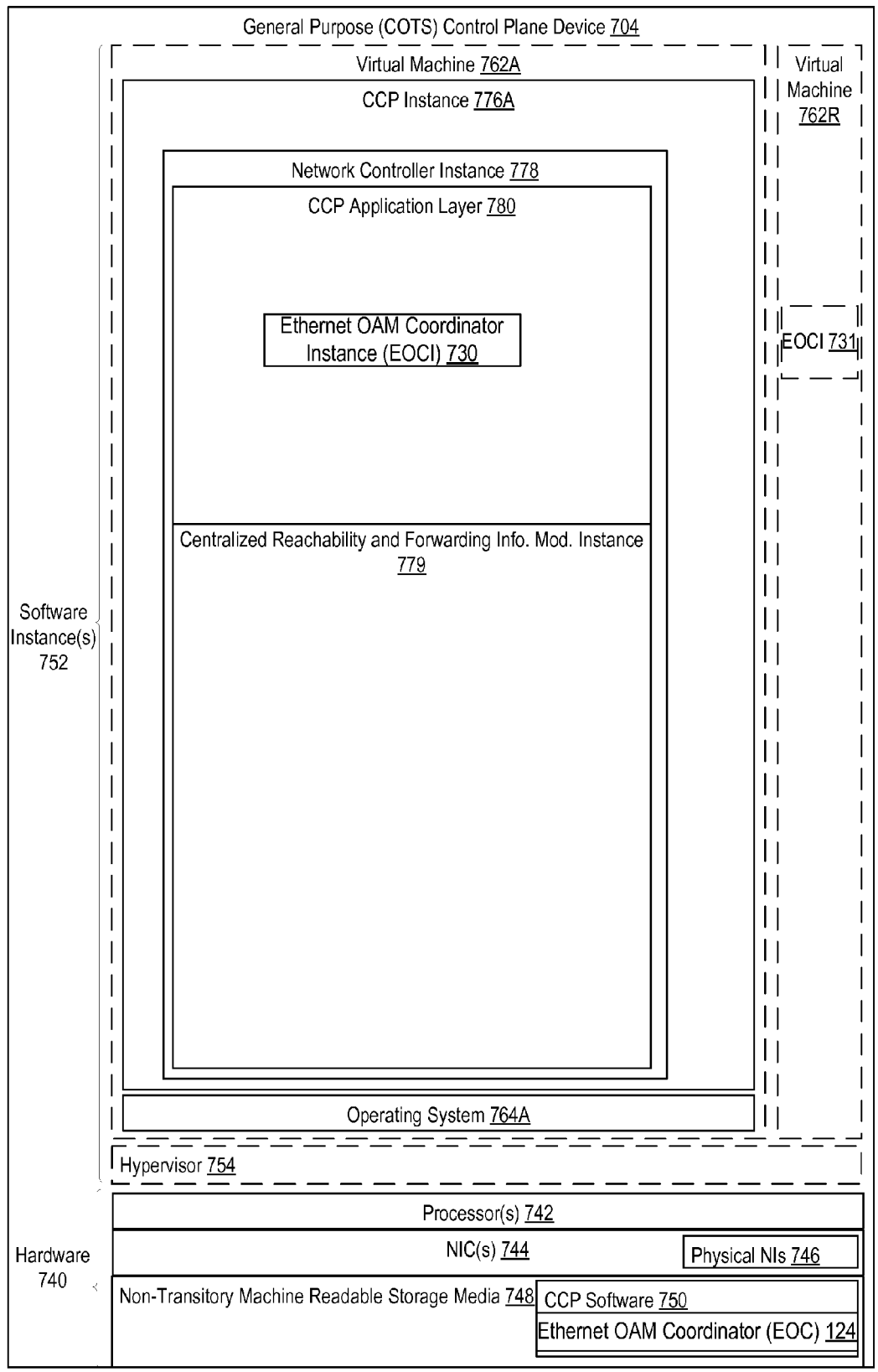
FIG. 7 illustrates a general purpose control plane device 704 including hardware 740 comprising a set of one or more processor(s) 742 (which are often Commercial off-the-shelf (COTS) processors) and network interface controller(s) 744 (NICs; also known as network interface cards) (which include physical NIs 746), as well as non-transitory machine readable storage media 748 having stored therein centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750. CCP software 750 contains Ethernet OAM coordinator (EOC) 124 as illustrated in FIG. 1A.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 678 to the operating system 764A and communicating with the various NEs), and an CCP application layer 780 (sometimes referred to as an application layer) over the middleware layer (providing the intelligence required for various network operations such as protocols, network situational awareness, and user—interfaces). At a more abstract level, this CCP application layer 780 within the centralized control plane 676 works with virtual network view(s) (logical view(s) of the network) and the middleware layer provides the conversion from the virtual networks to the physical view. CCP application layer 780 contains Ethernet OAM coordinator instance 730 which is an instance of Ethernet OAM coordinator 124.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagrams FIGS. 4-5 are described with reference to the exemplary embodiment of FIGS. 1A, 6, and 7. However, it should be understood that the operations of flow diagrams can be performed by embodiments of the invention other than those discussed with reference to the exemplary embodiment of FIGS. 1A, 6, and 7, and the exemplary embodiment of FIGS. 1A, 6, and 7 can perform operations different than those discussed with reference to the flow diagrams of FIGS. 4-5.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network element coupled to a software-defined networking (SDN) system, wherein the SDN system contains a plurality of network elements processing traffic flows and a SDN controller managing the plurality of network elements, the method comprising:
   adding an entry to a flow table of the network element, wherein the entry is a flow table entry associated with an operation, administration, and management (OAM) traffic flow for an Open System Interconnect (OSI) layer 2 (L2) service;
   adding an entry to a group table of the network element, wherein the entry is a group table entry to be selected upon receiving a packet matching the flow table entry, wherein the group table entry includes action buckets to cause the packet to be sent to a plurality of ports, including a loopback port for the packet to be looped back to the flow table at a predetermined interval;
   receiving, from the SDN controller, the packet directing to the group table entry; and
   sending the packet to the ports of the network element according to the group table entry, wherein the packet is to be looped back through the loopback port to the flow table of the network element periodically at the predetermined interval.

2. The method of claim 1, further comprising:
   sending a notification to the SDN controller upon determining that the packet fails to be looped back within a first timeout interval.

3. The method of claim 1, further comprising:
   receiving a request from the SDN controller to terminate the OAM traffic flow for the OSI L2 service; and
   removing the flow table entry associated with the OAM traffic flow.

4. The method of claim 1, wherein the packet is delayed through a traffic shaper in looping back to the flow table at the predetermined interval.

5. The method of claim 1, wherein the loopback port is a physical port wired to loop back to the network element.

6. The method of claim 1, wherein the loopback port is a logical port with emulated loopback functions.

7. The method of claim 1, wherein the packet is received at another network element, wherein the other network element identifies the packet is in the OAM traffic flow for the OSI L2 service, and wherein the other network element determines whether the packet is received within a second timeout interval.

8. The method of claim 7, wherein the other network element sends a notification to the SDN controller upon determining the packet is not received within the second timeout interval.

9. The method of claim 7, wherein the other network element receives another packet, wherein the other network element identifies the other packet associated with an unknown traffic flow, and wherein the other network element sends a notification to the SDN controller to obtain information to add a corresponding flow table entry.

10. The method of claim 1, wherein the network element and SDN controller operate within compliance of an OpenFlow standard, wherein the packet from the SDN controller is a PACKET_OUT message.

11. A network element coupled to a software-defined networking (SDN) system, wherein the SDN system contains a plurality of network elements processing traffic flows and a SDN controller managing the plurality of network elements, the network element comprising:
a processor and a non-transitory machine-readable storage medium coupled to the processor, the non-transitory machine-readable storage medium containing an Ethernet operation, administration, and management (OAM) module executable by the processor, wherein the network element is operative to:
add an entry to a flow table of the network element, wherein the entry is a flow table entry associated with an operation, administration, and management (OAM) traffic flow for an Open System Interconnect (OSI) layer 2 (L2) service,
add an entry to a group table of the network element, wherein the entry is a group table entry to be selected upon receiving a packet matching the flow table entry, wherein the group table entry includes action buckets to cause the packet to be sent to a plurality of ports, including a loopback port for the packet to be looped back to the flow table at a predetermined interval,
receive, from the SDN controller, the packet directing to the group table entry, and
send the packet to the plurality of ports of the network element according to the group table entry, wherein the packet is to be looped back through the loopback port to the flow table of the network element periodically at the predetermined interval.

12. The network element of claim 11, wherein the network element is further operative to:
send a notification to the SDN controller upon the determination of the packet failing to be looped back within a first timeout interval.

13. The network element of claim 11, wherein the network element is further operative to:
receive a request from the SDN controller to terminate the OAM traffic flow for the OSI L2 service, and
remove the flow table entry associated with the OAM traffic flow.

14. The network element of claim 11, wherein the packet is to be delayed through a traffic shaper in looping back to the flow table at the predetermined interval.

15. The network element of claim 11, the loopback port is a physical port wired to loop back to the network element.

16. A non-transitory machine-readable medium having instructions stored therein, which when executed by a processor, cause the processor to perform operations in a network element coupled to a software-defined networking (SDN) system, wherein the SDN system contains a plurality of network elements processing traffic flows and a SDN controller managing the plurality of network elements, the operations comprising:
adding an entry to a flow table of the network element, wherein the entry is a flow table entry associated with an operation, administration, and management (OAM) traffic flow for an Open System Interconnect (OSI) layer 2 (L2) service;
adding an entry to a group table of the network element, wherein the entry is a group table entry to be selected upon receiving a packet matching the flow table entry, wherein the group table entry includes action buckets to cause the packet to be sent to a plurality of ports, including a loopback port for the packet to be looped back to the flow table at a predetermined interval;
receiving, from the SDN controller, the packet directing to the group table entry; and
sending the packet to the plurality of ports of the network element according to the group table entry, wherein the packet is to be looped back through the loopback port to the flow table of the network element periodically at the predetermined interval.

17. The non-transitory machine-readable medium of claim 16, wherein the operations further comprise:
sending a notification to the SDN controller upon determining that the packet fails to be looped back within a first timeout interval.

18. The non-transitory machine-readable medium of claim 16, wherein the operations further comprise:
receiving a request from the SDN controller to terminate the OAM traffic flow for the OSI L2 service; and
removing the flow table entry associated with the OAM traffic flow.

19. The non-transitory machine-readable medium of claim 16, wherein the loopback port is a logical port with emulated loopback functions.

20. The non-transitory machine-readable medium of claim 16, wherein the network element and SDN controller operate within compliance of an OpenFlow standard, wherein the packet from the SDN controller is a PACKET_OUT message.

* * * * *